United States Patent
Peters

(10) Patent No.: US 8,561,528 B2
(45) Date of Patent: Oct. 22, 2013

(54) DEVICE AND METHOD FOR HEATING FOOD PRODUCTS

(75) Inventor: Antonius Leonardus Franciscus Peters, Sint Michielsgestel (NL)

(73) Assignee: Stork Titan B.V., Boxmeer (NL)

( * ) Notice: Subject to any disclaimer, the term of this patent is extended or adjusted under 35 U.S.C. 154(b) by 1479 days.

(21) Appl. No.: 11/988,434

(22) PCT Filed: Jul. 7, 2006

(86) PCT No.: PCT/NL2006/050170
§ 371 (c)(1),
(2), (4) Date: May 15, 2008

(87) PCT Pub. No.: WO2007/043878
PCT Pub. Date: Apr. 19, 2007

(65) Prior Publication Data
US 2009/0110794 A1    Apr. 30, 2009

(30) Foreign Application Priority Data
Jul. 8, 2005  (NL) .................................... 10299466

(51) Int. Cl.
*A47J 37/07*  (2006.01)
(52) U.S. Cl.
USPC ................... 99/443 R; 99/443 C; 219/460.1
(58) Field of Classification Search
USPC ........................ 99/443 C, 443 R; 219/460.1
See application file for complete search history.

(56) References Cited

U.S. PATENT DOCUMENTS

| 2,705,450 A | | 4/1955 | Steinbook |
| 3,746,546 A | | 7/1973 | Bateson et al. |
| 4,132,162 A | * | 1/1979 | Magnuson ...................... 99/630 |
| 4,554,437 A | * | 11/1985 | Wagner et al. ................ 219/388 |
| 6,369,360 B1 | * | 4/2002 | Cook ............................. 219/388 |
| 6,994,016 B1 | * | 2/2006 | Bunker et al. ................... 99/348 |
| RE42,732 E | * | 9/2011 | Zittel et al. ..................... 99/348 |
| 2004/0247762 A1 | | 12/2004 | Xu et al. |

FOREIGN PATENT DOCUMENTS

| EP | 0 715 826 A1 | 6/1996 |
| EP | 0 779 052 A | 6/1997 |
| WO | WO-01/19196 A2 | 3/2001 |

* cited by examiner

*Primary Examiner* — Henry Yuen
*Assistant Examiner* — Amit K Singh
(74) *Attorney, Agent, or Firm* — Birch, Stewart, Kolasch & Birch, LLP

(57) ABSTRACT

A device for heating the outside of food particles includes a substantially cylindrical tube extending with a substantially horizontal axis, a heating device configured to heat the tube on the outside, a drive device configured to drive the tube in rotation about its axis, a supply device configured to supply food particles to be heated to the interior of the tube in the vicinity of a first end of the tube, and a discharge device configured to discharge the heated food particles from the second end of the tube. The product is heated briefly by contact heating in a rotating tube, being carried along by the rotating part and detaching from the wall at a point in time due to gravity in combination with the rotating movement, and thereby coming loose from the other part of the tangle of meat.

16 Claims, 5 Drawing Sheets

DEVICE AND METHOD FOR HEATING FOOD PRODUCTS

BACKGROUND OF THE INVENTION

1. Field of the Invention

The invention relates to heating of food particles such as pieces of vegetable, pieces of meat such as minced meat, meat portions, pieces of chicken fillet, pieces of fish fillet and the like.

2. Description of Background Art

In the preparation of such products by heating, these products tend to stick together. Clumps of these products are hereby created so that the heat transfer process is made more difficult. This results in partially uncooked products.

It is known to process meat products, snacks, vegetables, fruit and entire meals by tumbling or marinating them. Tumbling is a treatment which is described in WO-A-01/19196. This treatment has for its object to add moisture and flavourings to these products before heating (boiling, cooking) them so as to define both the final yield and the desired taste. Meat proteins are activated by the tumbling and/or marinating so as to bind the desired moisture and/or flavourings. However, the different meat and/or vegetables or other additives also begin to display mutually adhering and binding properties due to the protein that is released. The individual meat parts, snack parts together form a conglomerate of particles. A mixture such as a tangled, sticky mass, a mash of pieces of meat and composite parts such as meat balls, sausages and the like make the subsequent treatment difficult. For the subsequent treatment, for instance cooking, deep-frying, coating, individual freezing or drying, it is desirable that the meat particles come to lie individually on the belt, in the flying fat, on a steel belt or in an airflow. The invention is by no means limited to such products; small meat products such as meat portions or mince meat particles can also be used. Such products can for instance be used in dried soups, on pizzas, in sauces or in ready-to-eat meals, for instance for institutions.

A combination of labour and/or mechanical aids have heretofore been used for this purpose. Such a treatment is not always effective. It thus occurs that the product adheres to the other particles, adheres to the belt or develops colour differences due to other contact.

SUMMARY OF THE INVENTION

The invention is based on the product being heated briefly by contact heating in a rotating tube, being carried along by the rotating part and detaching from the wall at a point in time due to gravity in combination with the rotating movement, and thereby coming loose from the other part of the tangle of meat.

This takes place thus for each part successively. Every particle eventually has a very thin, coagulated outer layer, whereby the adhesion and clinging properties have disappeared and a free flow material results.

Nor is the device according to the present invention applicable only to products pre-treated in this manner; other semi-products can also have properties whereby it is attractive to process them with the device according to the invention.

The present invention provides a device for heating the outside of food particles, comprising a substantially cylindrical tube extending with a substantially horizontal axis, heating means for heating the tube on the outside, drive means for driving the tube in rotation about its axis, supply means for supplying food particles for heating to the interior of the tube in the vicinity of a first end of the tube and discharge means for discharging the heated food particles from the second end of the tube.

The heated tube entrains the heated food particles in the upward moving part of the wall as a result of the friction force between particle and internal wall until gravity becomes, greater than the friction force and the particle fells or rolls downward. A different part of the skin of the heated food particle is hereby always in contact with the wall of the tube, whereby an optimal heating of the food particle is obtained. It is thus possible to process clustering, clinging and adhering products such that they are separated into the smallest units, such as particles, and these separated units remain separated.

The invention also relates to an associated method.

According to a first preferred embodiment, the axis of the tube extends horizontally. This is structurally simple but does require means for displacing the food particles through the tube in axial direction. It is however also possible to have the axis of the tube incline slightly so that the heated food particles are moved from the first end to the second end without further auxiliary means.

It is possible in principle to have the heating take place by for instance blowing hot air through the tube; it is however recommended to heat the particles through contact with the tube wall. Partly in this respect the inner wall of the tube has a smooth finish; the degree of smoothness or roughness can however be adjusted to the nature of the products for heating; it is after all essential that the roughness is such that the products for heating are carried along by the upward moving part of the tube wall. In order to prevent sticking the inner wall of the tube is preferably provided with a layer of nonstick material such as teflon.

According to a subsequent preferred embodiment, the heating means comprise IR radiation sources which are placed on at least one side of the tube and which are adapted to heat the outside of the tube by means of IR radiation. This avoids the heating means having to co-rotate with the tube.

Depending on the nature of the products for heating and the method of preparation, it can be attractive that the heating means are adapted to maintain a different temperature along the longitudinal direction of the tube.

In order to optimize the efficiency of the IR radiation sources, a further embodiment proposes that an envelope reflecting IR radiation on the inside is placed around the assembly of IR radiation source and tube.

The IR radiation sources require cooling. In order to usefully employ the resulting heated cooling air, the device preferably comprises a substantially closed housing which encases the tube, the IR radiation source and the envelope together and which rests on a frame, and a fan for feeding cooling air to the IR radiation source and for carrying into the interior of the housing cooling air that has passed over the IR radiation source, wherein a duct, which is adapted to carry the cooling air leaving the housing into the interior of the tube, connects to the housing.

A structurally attractive preferred embodiment provides the measure that the frame is provided in axial direction outside the housing with bearings on which the tube rests by means of rings arranged round the tube, and that there is arranged around the tube on a first side of the housing a drive ring which is adapted to be driven by a drive device placed in the frame.

The transport member for carrying the food particles for processing into the tube preferably comprises a tube leading from a funnel, in which tube is placed a conveyor screw, which is likewise preferably movable in substantially axial direction relative to the tube.

Particularly, though not exclusively in the case of a tube with horizontal axis, the food particles must be moved through the tube. Engaging means for the food particles are preferably placed in the tube which are adapted to transport the food particles through the tube. These engaging means can be connected to the tube, for instance in the form of a type of blade, but they can also be rotatable independently of the tube.

It is however recommended that the engaging means are fixedly disposed independently of the tube.

Partly in respect of weight and the space for other means to be arranged, it is structurally attractive that the body extends helically and that the body is strengthened with axially extending bars.

Jamming of the particles for heating between the body and the tube is prevented when the outer edge of the body lies outside the envelope of the assembly of bars.

For cleaning and inspection purposes it is attractive that the body is movable in axial direction outside of the tube, which can be achieved in structurally attractive manner when the body is connected to a carriage which can travel over a sub-frame extending in line with the frame on the second side of the tube.

The body is supported on both sides during use. When moving in and out this is not the case, so that the body is then cantilevered over a relatively great length and will bend. In order to prevent the body from contacting the inner wall of the tube, it is attractive that the parts of the sub-frame supporting the carriage can be moved at least partially in upward direction. It is otherwise also possible to adapt the carriage itself to move the body upward.

Yet another preferred embodiment provides the measure that the device is connected to a pre-treatment device for pre-treating the food particles to be processed in the device. It is important for a number of products that they be subjected to a pre-treatment such as pre-heating. This is particularly the case, though not exclusively, for meat products, since the proteins contained in these meat products need a certain time to coagulate. It is possible in principle to select the length of stay in the heated tube such that this coagulation takes place, although this is not always attractive from an economic viewpoint. Part of the coagulation already takes place due to the pre-heating, so this coagulation can also be completed within a short duration of stay in the tube.

In order to have the pre-heating take place in an effective manner, it takes place in a channel with a relatively small cross-section through which the food particles are carried close together. It is hereby possible to opt for quite a long duration of stay, even at a high flow rate. The heat transfer between the wall of the channel and the food particles and between the food particles themselves is moreover optimal since the particles are packed closely together.

Owing to this pre-heating process the food particles do adhere to each other. Because they are in mutual contact no browning takes place, or hardly any. In order to separate the food particles a separating device for the food particles, such as a grinder, is then preferably placed between the pre-heating device and the actual device according to the invention.

The food particles separated in the grinder are heated in the tube according to the invention without the danger of mutual adhesion because the food particles are always being moved relative to each other. This moreover provides the possibility that the food particles are browned. For carrying through the channel of the pre-heating device under a certain pressure use is made of a pump. This pump is preferably coupled to a metering device for precisely determining the flow rate and thereby the process parameters. This is also the case for the liquid circuit with which the channel is heated.

Yet another embodiment provides the measure that the device is connected to a further device for carrying out a further treatment such as further cooking. It is however also possible for the further device to be a drying device or a freezing device.

Device as claimed in any of the foregoing claims, characterized by a supply device extending into the interior of the tube for supplying additives such as fats, flavourings or ingredients to the heating device.

The invention will be elucidated hereinbelow with reference to the accompanying figures, in which:

DETAILED DESCRIPTION OF THE PREFERRED EMBODIMENTS

Figure 1:
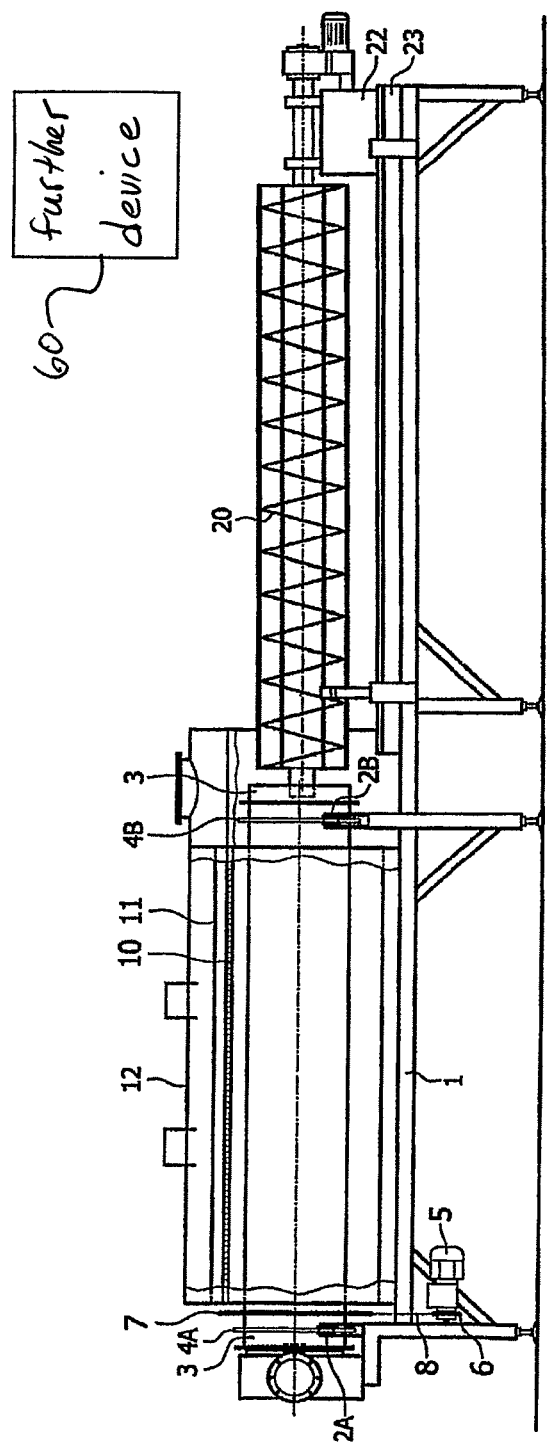
FIG. 1 shows a sectional view in longitudinal direction of the device according to the invention.
Figure 2:
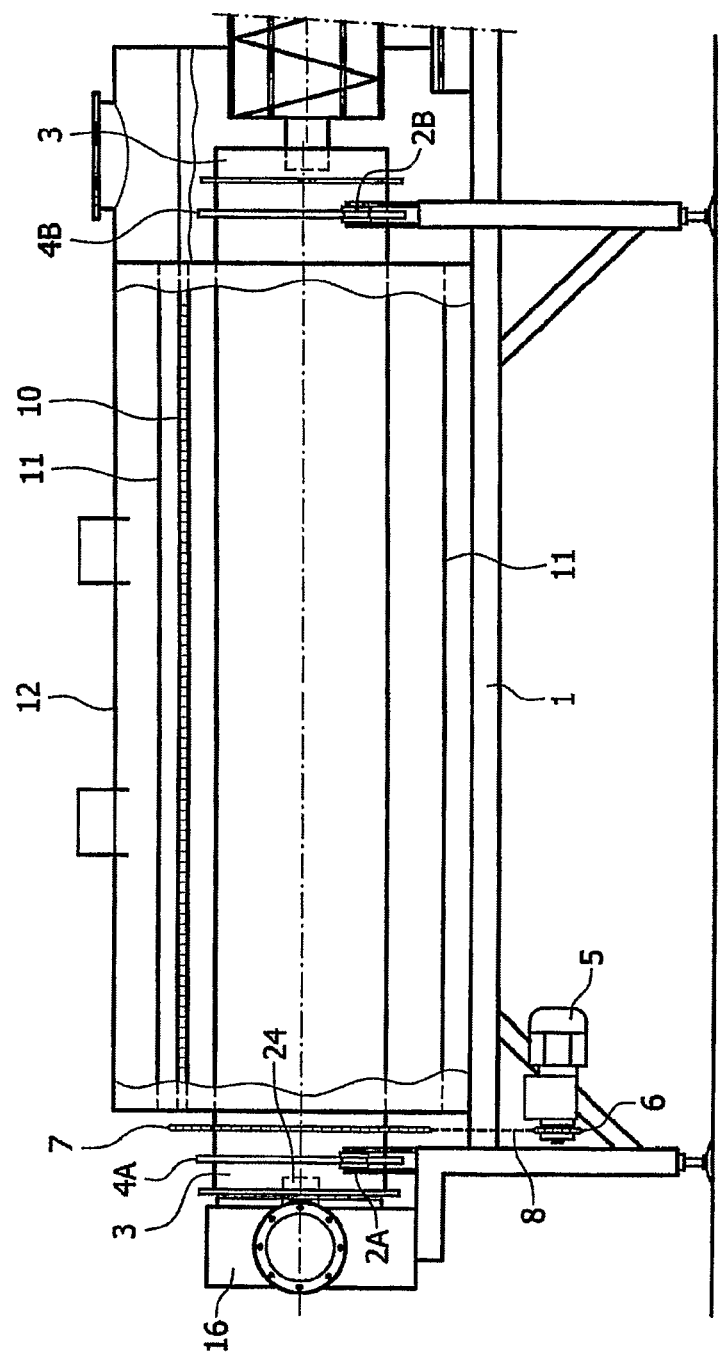
FIG. 2 shows a detail view corresponding to FIG. 1.

The device shown in the figures comprises a frame 1 on which two pairs of support bearings 2A, 2B respectively are arranged. A tube 3 is provided with two support rings 4A, 4B respectively whereby tube 3 rests rotatably on bearings 2A, 2B. One of the pairs of bearings 2B is herein adapted to compensate for length changes in tube 3 as a result of temperature changes. Mounted on frame 1 is an electric motor 5 which is provided with a sprocket 6. Further arranged around tube 3 is a sprocket 7 which is driven via a chain 8 trained around sprockets 6 and 7.

On one side of tube 3 is arranged a heating device in the form of an array of IR radiators 10. These IR radiators 10 are directed at tube 3 for the purpose of heating around the whole tube 3 as a result of the rotation of tube 3. Arranged around the assembly of tube 3 and IR radiators 10 is a substantially cylindrical reflector 11 which is polished to a shine on its inner side in order to reflect IR radiation coming from IR radiators 10.

Placed around reflector 11 is a housing 12, which in turn rests on frame 1. It is pointed out here that the tube extends outside the housing on both sides.

IR radiators 10 require cooling air which is supplied via a fan casing 13 and which, after passing over IR radiators 10, continues on through the housing above and below tube 3 to the other side of tube 3 and is then discharged laterally by an air collecting casing 14. Air collecting casing 14 is coupled to a tube 15 which leads to a supply casing 16 connected to the first end of tube 3. The second end of tube 3 is open. The fan air heated by the IR radiators is thus carried initially along the tube, where a heat transfer can take place, and the air is then carried through the tube, where the hot air can transfer at least part of its heat to the food products for heating. The supplied energy is hereby used more efficiently so that less energy is lost.

The shown device has a horizontal axis so that means must be provided for transporting the heated products in axial direction through the tube. For this purpose a transport member is arranged in the form of a substantially helical body 20 which, because it only forms an extremely light, fragile structure, is strengthened by rods 21 extending in axial direction. A type of cage structure is hereby obtained. Helical body 20 herein extends further in radial direction than rods 21. This helical body 20 extends to a position in the vicinity of the inner wall of tube 3 so that the treated products are transported through tube 3 in radial direction as a result of helical body 20. The pitch of helical body 20 is hereby adjusted to the required duration of stay, this of course in combination with the rotation speed of tube 3. The distance between helical body 20 and the tube, which is in the order of magnitude of 1 cm, can also be adjusted to the nature of the products for heating.

This cage construction formed by helical body 20 and rods 21, which is also as hollow as possible in its interior, is mounted on a carriage 22 on the second side of tube 3. This carriage 22 is slidable in axial direction over an extension 23 of frame 1. As a result the cage construction can be moved into and out of tube 3 in axial direction of the tube. It is pointed out here that, when the cage construction is situated in the tube, the first end of the cage construction is supported by a relevant support bearing 24. As soon as carriage 22 is moved away from tube 3, the cage construction can no longer rest on this support bearing 24. A certain degree of bending will therefore occur, which is compensated by moving carriage 22, and thereby the cage construction, upward. This is achieved by displacing the upper part of the extension of the frame upward by means of screw spindles. In the construction realized here this takes place on only one side so that, when said screw spindles are operated, the upper part of the extension of the frame tilts about an axis extending in axial direction of the tube.

It is pointed out that it is possible in principle to drive the cage construction in rotation. A better control of the process is hereby achieved. It is also possible to embody the transport means in the form of blades or strips attached fixedly in the tube.

Figure 3:
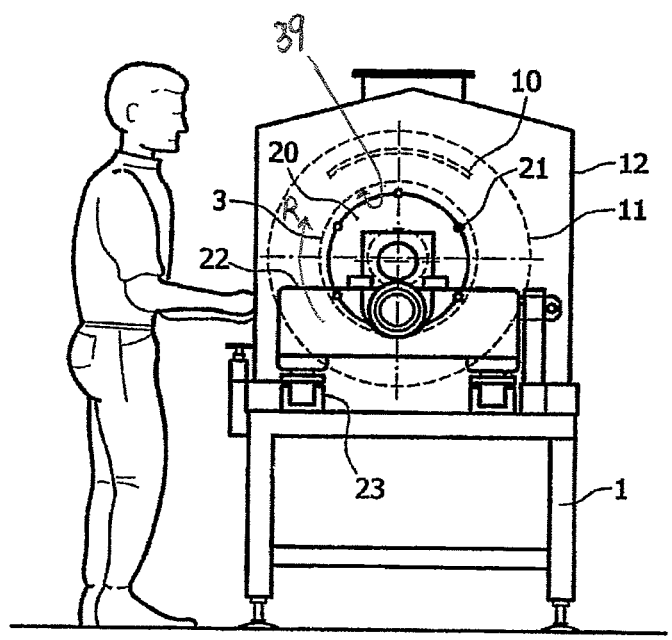
FIG. 3 is a cross-sectional view of the device shown in FIGS. 1 and 2.
Figure 4:
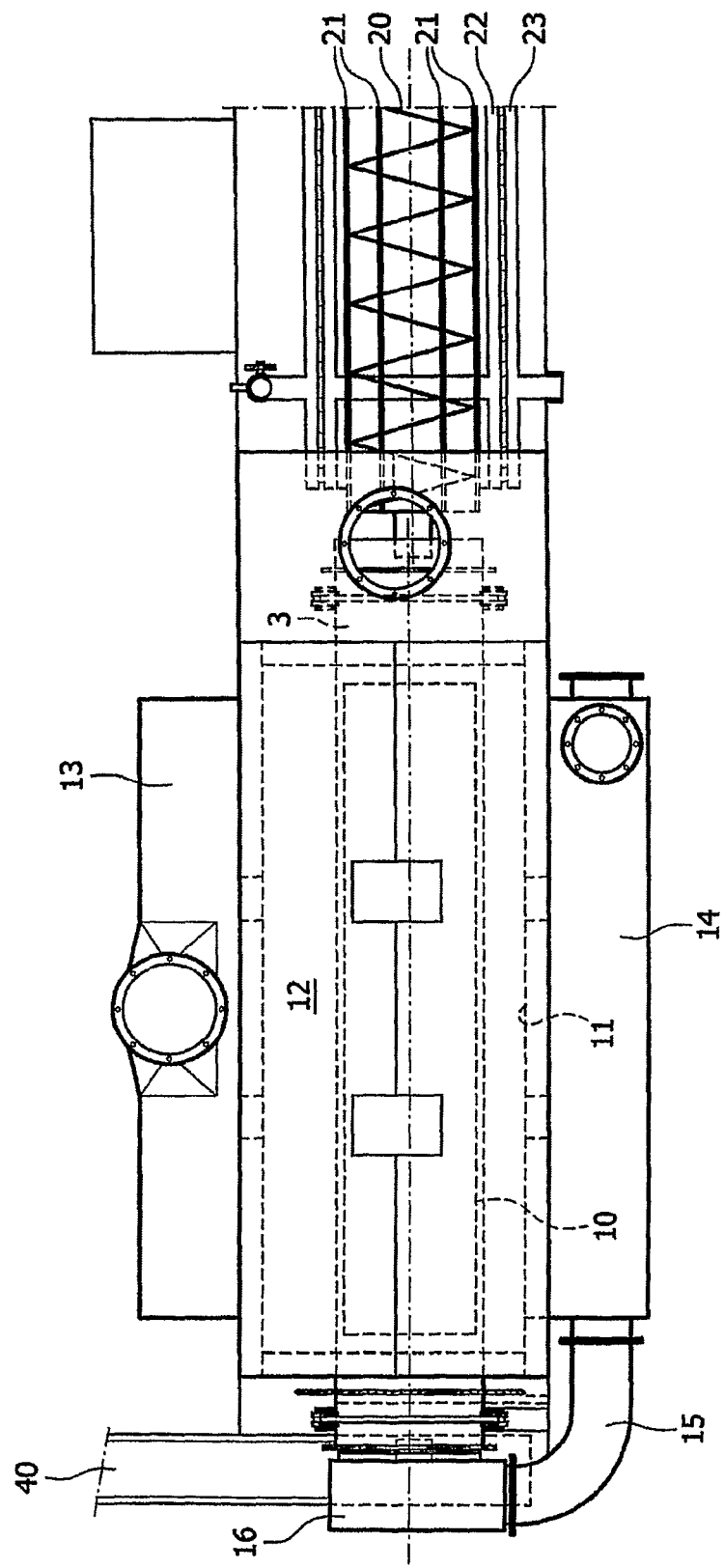
FIG. 4 is a top view of the device shown in the previous figures.
Figure 5:
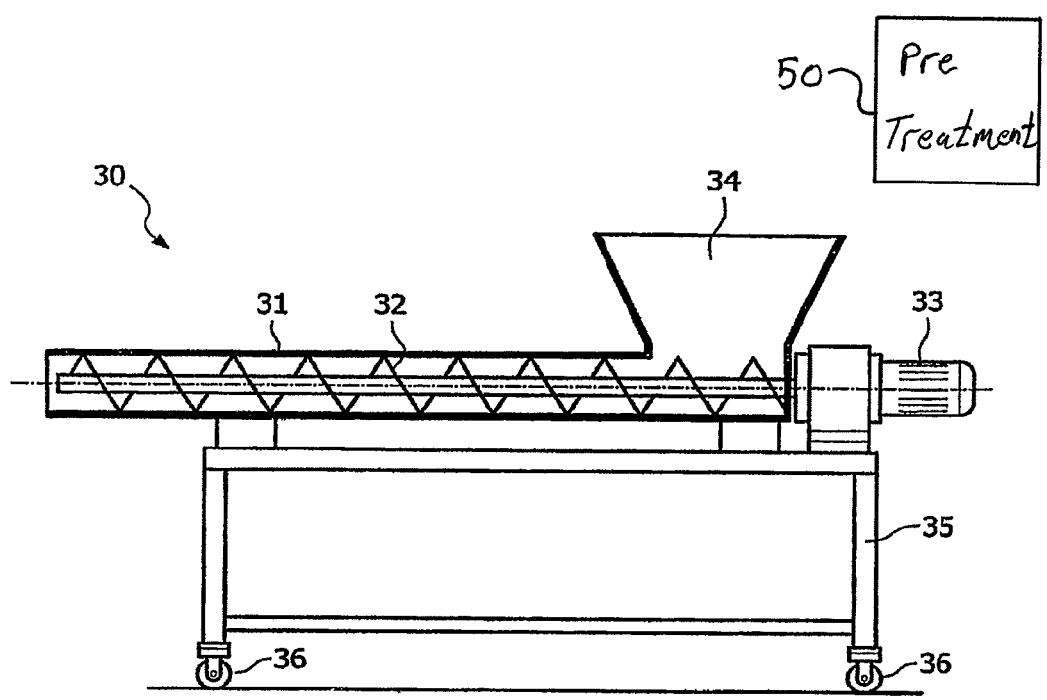
FIG. 5 is a cross-sectional view of a supply device for products for processing for use with the device shown in the previous figures.

The heated tube entrains the heated food particles in the upward moving part of the wall 39 due to a rotation of the tube in the direction R as shown in FIG. 3, as a result of the friction force between particle and internal wall until gravity becomes, greater than the friction force and the particle fells or rolls downward. A different part of the skin of the heated food particle is hereby always in contact with the wall of the tube, whereby an optimal heating of the food particle is obtained. It is thus possible to process clustering, clinging and adhering products such that they are separated into the smallest units, such as particles, and these separated units remain separated.

The heated tube entrains the heated food particles in the upward moving part of the wall 39 due to a rotation of the tube in the direction R as shown in FIG. 3, as a result of the friction force between particle and internal wall until gravity becomes, greater than the friction force and the particle fells or rolls downward. A different part of the skin of the heated food particle is hereby always in contact with the wall of the tube, whereby an optimal heating of the food particle is obtained. It is thus possible to process clustering, clinging and adhering products such that they are separated into the smallest units, such as particles, and these separated units remain separated.

For the purpose of supplying the material for heating to the ulterior of the tube use is made of a supply device designated as a whole with 30. The supply device comprises a substantially horizontally extending tube 31 in which is arranged a conveyor screw 32 which can be driven by an electric motor 33. A supply funnel 34 is arranged connecting onto the tube. This unit is placed on a frame 35 which can travel in longitudinal direction by means of wheels 36. This supply device 30 is moved with the distal end of tube 31 into the interior of tube 3 of the heating device according to the invention.

For the discharge of the products which have undergone heating a conveyor belt (not shown) extending in a transverse direction is arranged under the second end of tube 3 and leads to a collecting tank or to a device for further processing of the products.

The above described device is used for heating food particles through contact heat, wherein singulation of the particles occurs. The above described device is hereby particularly suitable for treating lumpy food particles, or food particles which otherwise stick together or aggregate, such as for instance minced meat. This configuration is moreover particularly suitable for the preparation of so-called 'topping', i.e. garnish for pizzas and the like, and is preferably followed by a freezing device for freezing the thus obtained semi-product.

Because the duration of stay in the tube is limited, it may be too short for fully cooking determined products requiring a long cooking time. For such situations it is attractive to make use of a pre-treatment device 50 which already carries out part of the cooking process. Such a pre-treatment device can be formed by a heating device which heats the products so that part of the cooking process is already carried out before the product reaches a device according to the invention, and the cooking process is there completed. For this purpose use can be made of a heated channel through which the product for heating is carried in the form of a paste. Heating can take place with a heating sleeve through which a hot liquid such as oil or water flows and which is arranged around the channel. Other pre-treatments can be performed depending on the nature of the product. It is also possible to perform further treatments, such as browning of the obtained product by means of a hot air oven or freezing or freeze-drying of the product leaving the device according to the invention. The further treatment device is illustrated in FIG. 1 by reference numeral 60.

The invention claimed is:
1. A device for heating the outside of food particles, comprising:
 a substantially cylindrical tube extending with a substantially horizontal axis, said substantially cylindrical tube including an internal wall;
 a heating device configured to heat the tube on an outside thereof, wherein the tube is dimensioned for heating of the food particles through contact transfer;
 a drive device configured to drive the tube in rotation about the substantially horizontal axis thereof;
 a supply device configured to supply food particles to be heated to an interior of the tube in a vicinity of a first end of the tube;
 a discharge device configured to discharge the heated food particles from a second end of the tube; and
 an engaging device configured to engage the food particles that are placed in the tube, said engaging device being adapted to transport the food particles through the tube, the engaging device being provided with a drive device that is separate from the drive device of the tube so that the engaging device is rotatable independently of the tube and the engaging device is fixedly disposed independently of the tube,
 wherein the tube is adapted to entrain the food particles after being heated in an upward moving part of the internal wall, as a result of a friction force between the food particles and the internal wall of the tube, until a gravity force becomes greater than the friction force, and wherein the engaging device comprises a helical body movable in an axial direction to a position outside of the tube, and the helical body is connected to a carriage which can travel over a sub-frame extending in line with the frame on a second end of the tube.

2. The device as claimed in claim 1, wherein the heating device includes IR radiation sources which are placed on at least one side of the tube and which are adapted to heat the outside of the tube by means of IR radiation.

3. The device as claimed in claim 1, wherein the heating device is adapted to maintain a different temperature along a longitudinal direction of the tube.

4. The device as claimed in claim 2, further comprising a reflector placed around the IR radiation sources and the tube.

5. The device as claimed in claim 4, wherein a substantially closed housing encases the tube, the IR radiation sources and the reflector together and rests on a frame, and a fan feeds cooling air to the IR radiation sources and carries into the interior of the housing cooling air that has passed over the IR radiation sources, wherein a duct, which is adapted to carry the cooling air leaving the housing into the interior of the tube, connects to the housing.

6. The device as claimed in claim 5, wherein the frame is provided in an axial direction outside the housing with bearings on which the tube rests by means of rings arranged round the tube, and there is arranged around the tube on the first side of the housing a drive ring which is adapted to be driven by a drive device placed in the frame.

7. The device as claimed in claim 1, wherein the supply device comprises a transport member extending into the interior of the tube and extending in a substantially axial direction.

8. The device as claimed in claim 7, wherein the transport member comprises a transport tube leading from a funnel, in which transport tube is placed a conveyor screw.

9. The device as claimed in claim 7, wherein the transport member is movable in a substantially axial direction relative to the tube.

10. The device as claimed in claim 1, wherein the helical body is strengthened with axially extending rods.

11. The device as claimed in claim 1, wherein the parts of the sub-frame supporting the carriage can be moved at least partially in an upward direction.

12. A device for heating the outside of food particles, comprising:
  a substantially cylindrical tube extending with a substantially horizontal axis;
  a heating device configured to heat the tube on an outside thereof;
  a drive device configured to drive the tube in rotation about the substantially horizontal axis thereof;
  a supply device configured to supply the food particles to be heated to an interior of the tube in a vicinity of a first end of the tube;
  a discharge device configured to discharge the heated food particles from a second end of the tube; and
  an engaging device configured to engage the food particles placed in the tube,
  wherein the engaging device is adapted to transport the food particles through the tube, and
  wherein the engaging device comprises a helical body that is movable in an axial direction to a position outside of the tube, and wherein the body is connected to a carriage which can travel over a sub-frame extending in line with the frame on a second end of the tube.

13. The device as claimed in claim 12, wherein the parts of the sub-frame supporting the carriage can be moved at least partially in an upward direction.

14. The device as claimed in claim 12, wherein the heating device includes IR radiation sources which are placed on at least one side of the tube and which are adapted to heat the outside of the tube by means of IR radiation.

15. The device as claimed in claim 12, wherein the heating device is adapted to maintain a different temperature along a longitudinal direction of the tube.

16. The device as claimed in claim 14, further comprising a reflector placed around the IR radiation sources and the tube.

* * * * *